US012634285B2

(12) United States Patent
Bakke

(10) Patent No.: US 12,634,285 B2
(45) Date of Patent: *May 19, 2026

(54) ACCESS CONTROL AND ROUTING OPTIMIZATION AT A CLOUD HEADEND IN A CLOUD-BASED SECURE ACCESS SERVICE ENVIRONMENT

(71) Applicant: Cisco Technology, Inc., San Jose, CA (US)

(72) Inventor: Mark A. Bakke, Maple Grove, MN (US)

(73) Assignee: Cisco Technology, Inc., San Jose, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 18/807,340

(22) Filed: Aug. 16, 2024

(65) Prior Publication Data

US 2024/0414160 A1     Dec. 12, 2024

Related U.S. Application Data

(63) Continuation of application No. 17/678,885, filed on Feb. 23, 2022, now Pat. No. 12,132,734.

(51) Int. Cl.
*H04L 9/40*        (2022.01)
*H04L 12/46*       (2006.01)
*H04L 45/00*       (2022.01)

(52) U.S. Cl.
CPC .......... *H04L 63/10* (2013.01); *H04L 12/4641* (2013.01); *H04L 45/54* (2013.01); *H04L 63/0263* (2013.01); *H04L 63/0272* (2013.01); *H04L 63/20* (2013.01)

(58) Field of Classification Search
CPC ...... H04L 63/10; H04L 63/0263; H04L 45/54
See application file for complete search history.

(56) References Cited

U.S. PATENT DOCUMENTS

| | | | |
|---|---|---|---|
| 10,680,945 B1 | 6/2020 | Ye et al. | |
| 12,132,734 B2 * | 10/2024 | Bakke | H04L 12/4641 |
| 12,457,216 B2 * | 10/2025 | Bakke | H04L 63/101 |
| 2016/0204983 A1 | 7/2016 | Huynh Van et al. | |
| 2017/0288906 A1 | 10/2017 | Paredes et al. | |
| 2020/0076694 A1 | 3/2020 | Drury et al. | |
| 2020/0145335 A1 | 5/2020 | Wijnands et al. | |
| 2020/0314212 A1 | 10/2020 | Branch et al. | |

(Continued)

*Primary Examiner* — David J Pearson
(74) *Attorney, Agent, or Firm* — Polsinelli P.C.

(57)          ABSTRACT

In one aspect, the present disclosure is directed to a method that includes receiving, at an edge component of a cloud-based secure access service, a corresponding access designation for each of a plurality of endpoints, each access designation specifying a type of access a corresponding endpoint has to remaining ones of the plurality of endpoints and other accessible network resources; based on the corresponding access designation of each of the plurality of endpoints, updating a routing table at the edge component, to include routing information for a subset of the plurality of endpoints having access to at least one other endpoint of the plurality of endpoints or to the other accessible network resources; and enabling routing of network traffic, via the cloud-based secure access service, between any number of the plurality of endpoints based at least in part on the routing table.

20 Claims, 10 Drawing Sheets

(56) References Cited

U.S. PATENT DOCUMENTS

| 2020/0389393 | A1 | 12/2020 | Bosch et al. |
| 2020/0412608 | A1 | 12/2020 | Dunbar et al. |
| 2022/0006839 | A1 | 1/2022 | Douglas et al. |
| 2023/0007025 | A1 | 1/2023 | Weingarten et al. |
| 2023/0105873 | A1 | 4/2023 | Narayan et al. |
| 2023/0216890 | A1 | 7/2023 | Kairali et al. |

* cited by examiner

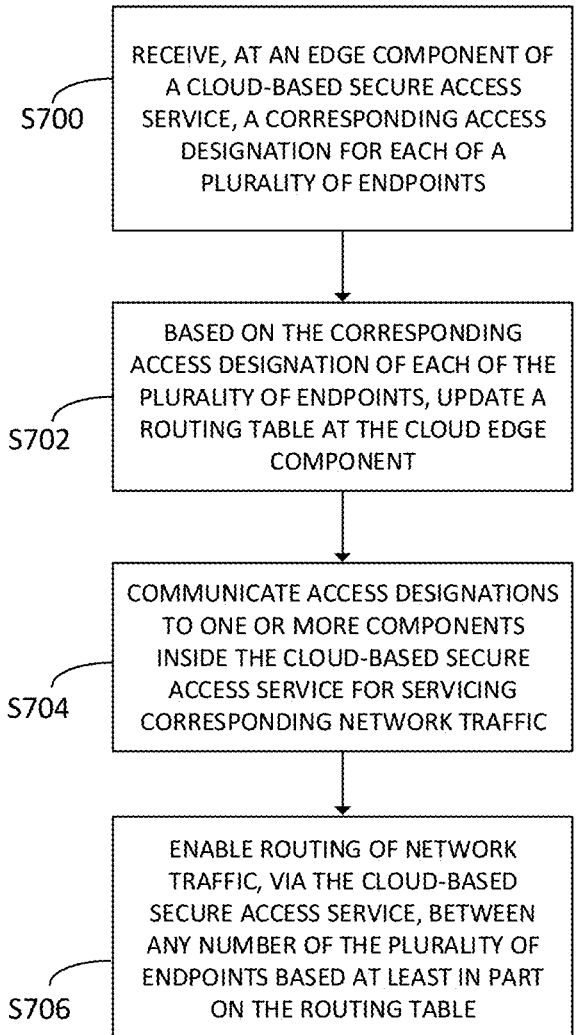

S700 — RECEIVE, AT AN EDGE COMPONENT OF A CLOUD-BASED SECURE ACCESS SERVICE, A CORRESPONDING ACCESS DESIGNATION FOR EACH OF A PLURALITY OF ENDPOINTS

S702 — BASED ON THE CORRESPONDING ACCESS DESIGNATION OF EACH OF THE PLURALITY OF ENDPOINTS, UPDATE A ROUTING TABLE AT THE CLOUD EDGE COMPONENT

S704 — COMMUNICATE ACCESS DESIGNATIONS TO ONE OR MORE COMPONENTS INSIDE THE CLOUD-BASED SECURE ACCESS SERVICE FOR SERVICING CORRESPONDING NETWORK TRAFFIC

S706 — ENABLE ROUTING OF NETWORK TRAFFIC, VIA THE CLOUD-BASED SECURE ACCESS SERVICE, BETWEEN ANY NUMBER OF THE PLURALITY OF ENDPOINTS BASED AT LEAST IN PART ON THE ROUTING TABLE

FIG. 7

ACCESS CONTROL AND ROUTING OPTIMIZATION AT A CLOUD HEADEND IN A CLOUD-BASED SECURE ACCESS SERVICE ENVIRONMENT

CROSS-REFERENCE TO RELATED APPLICATIONS

This application is a continuation of U.S. patent application Ser. No. 17/678,885 filed on Feb. 23, 2022, the contents of which are incorporated by reference in their entirety.

TECHNICAL FIELD

The present technology pertains to addressing security of and optimization of cloud-based wireless networks, and in particular to access control and routing optimization at a cloud-based secure access service accessible to remotely connected endpoints.

BACKGROUND

Secure Access Service Edge (SASE) combines networking and security functions in the cloud to deliver seamless, secure access to applications, anywhere users work. Example functionalities provided by SASE include, but are not limited to, software-defined wide area network, secure web gateway, firewall as a service, cloud access security broker, and zero-trust network access. The SASE model aims to consolidate these functions in a single, integrated cloud service.

Bringing all of an organization's data centers, branch offices, and telecommuters into a single, scalable cloud head end, acting as a connecting point of all endpoints to the SASE, simplifies providing common, up-to-date, and scalable security services across an organization. However, this can present some new challenges. For example, an organization may not want every location to be able to access every other location, but instead allow a limited set of locations or endpoints to be accessible to one another, and may want the majority of branch offices, for example, to be able to access resources in an on-premises location, but not each other. As the number of endpoints scales, along with the services headends, many routes need to be kept and propagated to allow traffic between any two endpoints, but at the same time, many rules are needed to prevent traffic that is unwanted.

BRIEF DESCRIPTION OF THE DRAWINGS

FIG. 7 illustrates example process for access control and routing optimization, according to some aspects of the present disclosure;

DETAILED DESCRIPTION

Figure 1:
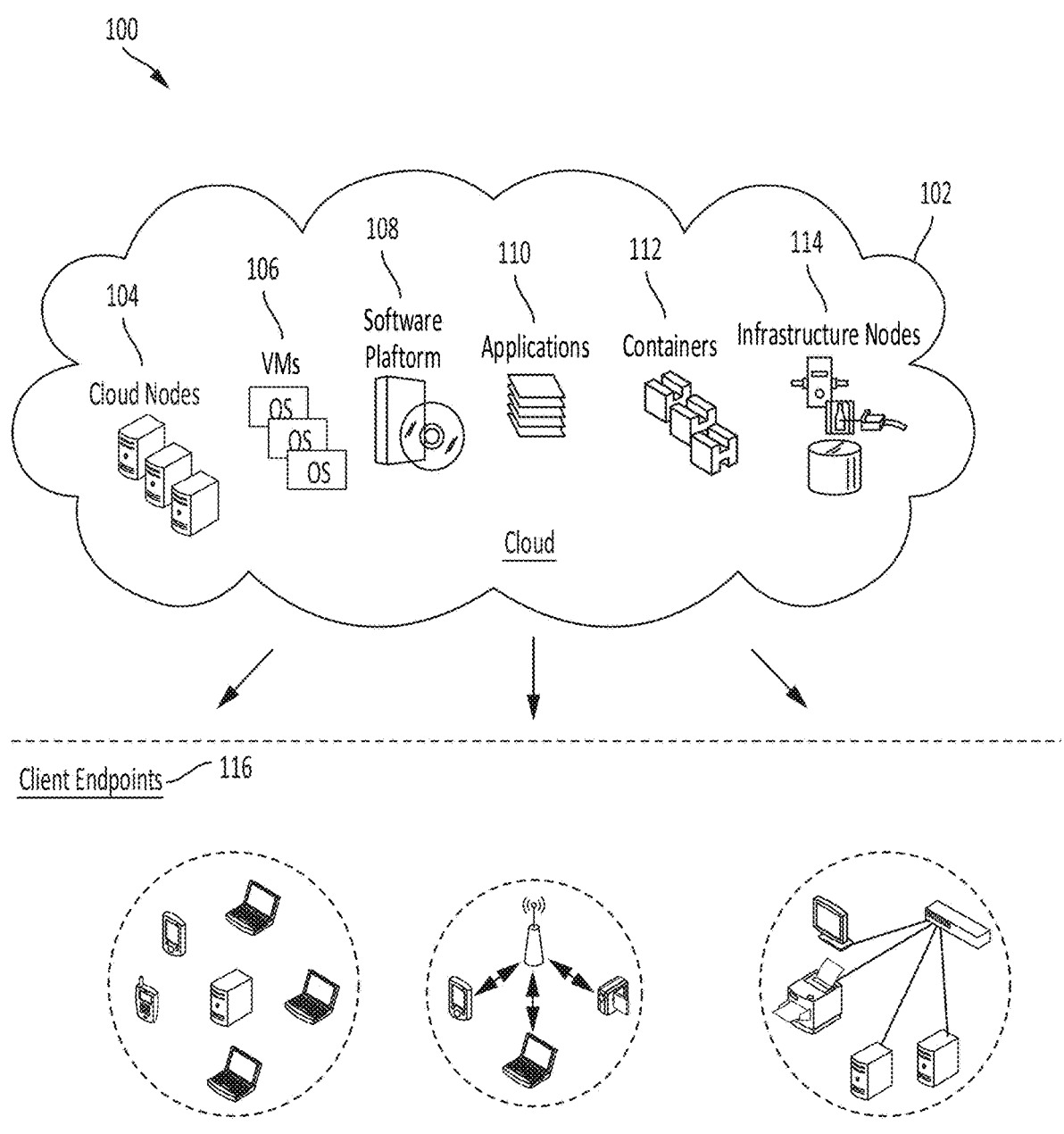
FIG. 1 illustrates an example cloud computing architecture, according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the example embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Systems, methods, and computer-readable media are disclosed for providing access control and network traffic routing optimization at one or more cloud headends (edge components) of a cloud-based service (i.e., a Secure Access Service Edge (SASE) architecture). Each cloud headend of the SASE architecture may include a number of data nodes each having a tunnel to one or more connected endpoints (e.g., devices, on-premise data centers, servers, etc.). Each endpoint may be configured with a particular access designation (e.g., public, private, shared, isolated, etc., which will be described below). The access designation of each endpoint may be communicated to a corresponding data node and/or shared with other data nodes. Based on the access designation of endpoints, a data node may update a routing table at the cloud headend to include entries identifying routes between endpoints permitted to communicate/access one another. By implementing this process, if an organization has 10,000 locations world-wide connected to a SASE architecture, each data node that would otherwise need to know at least 10,000, and probably more, routes to be able to handle any-to-any traffic, can now operate knowing only a small subset of routes (e.g., a few hundred), assuming only a small number of endpoints need to talk to each other. This in turn, makes network traffic propagation faster and less burdensome on memory and network resources.

In one aspect, a method includes receiving, at an edge component of a cloud-based secure access service, a corresponding access designation for each of a plurality of endpoints, each access designation specifying a type of access a corresponding endpoint has to remaining ones of the plurality of endpoints and other accessible network resources, the plurality of endpoints being remotely connected to the cloud-based secure access service via the edge component and using a corresponding virtual private network connection; based on the corresponding access designation of each of the plurality of endpoints, updating a routing table at the edge component, to include routing information for a subset of the plurality of endpoints having access to at least one other endpoint of the plurality of endpoints or to the other accessible network resources; and enabling routing of network traffic, via the cloud-based secure access service, between any number of the plurality of endpoints based at least in part on the routing table.

In another aspect, the corresponding access designation is one of a public access allowing a corresponding endpoint full access to the remaining ones of the plurality of endpoints and the other accessible network resources; a private access allowing access to one or more of the plurality of endpoints having a public access designation; a shared access allowing access to one or more of the plurality of endpoints having the private access designation; and an isolated designation allowing access only to the internet.

In another aspect, updating the routing table includes deleting at least one entry in the table identifying a route between two of the plurality of endpoints having the isolated designation.

In another aspect, the edge component is at a first data center of the cloud-based secure access service.

In another aspect, the method includes sending the updated routing table to at least one other edge component at a second data center of the cloud-based secure access service.

In another aspect, the method includes sending the corresponding access designation of each of the plurality of endpoints to one or more components at the cloud-based secure access service for servicing associated network traffic, the one or more components applying network and security policies to the associated network traffic based on a corresponding access designation of a given one of the plurality of endpoints.

In one aspect, an edge component of a cloud-based secure access service includes one or more memories having computer-readable instructions stored thereon; and one or more processors. The one or more processors are configured to execute the computer-readable instructions to receive a corresponding access designation for each of a plurality of endpoints, each access designation specifying a type of access a corresponding endpoint has to remaining ones of the plurality of endpoints and other accessible network resources, the plurality of endpoints being remotely connected to the cloud-based secure access service via the edge component and using a corresponding virtual private network connection; based on the corresponding access designation of each of the plurality of endpoints, update a routing table at the edge component, to include routing information for a subset of the plurality of endpoints having access to at least one other endpoint of the plurality of endpoints or to the other accessible network resources; and enable routing of network traffic, via the cloud-based secure access service, between any number of the plurality of endpoints based at least in part on the routing table.

In another aspect, the edge component comprises a number of data nodes and each data node has a corresponding routing table.

In another aspect, the one or more processors are configured to update the corresponding routing table for each of the data nodes.

In one aspect, one or more non-transitory computer-readable media include computer-readable instructions, which when executed by one or more processors of an edge component of a cloud-based secure access service, cause the edge component to receive a corresponding access designation for each of a plurality of endpoints, each access designation specifying a type of access a corresponding endpoint has to remaining ones of the plurality of endpoints and other accessible network resources, the plurality of endpoints being remotely connected to the cloud-based secure access service via the edge component and using a corresponding virtual private network connection; based on the corresponding access designation of each of the plurality of endpoints, update a routing table at the edge component, to include routing information for a subset of the plurality of endpoints having access to at least one other endpoint of the plurality of endpoints or to the other accessible network resources; and enable routing of network traffic, via the cloud-based secure access service, between any number of the plurality of endpoints based at least in part on the routing table.

Example Embodiments

With remote access to cloud services becoming ever more prevalent, there is a need for organization to reduce their dependency and expenditure on purchasing equipment and configuring them to service the remote access need of their customers and employees. A cloud-based Secure Access Service (SASE) is a serviced based system that addresses this need. As noted above, a SASE service combines networking and security functions in the cloud to deliver seamless, secure access to applications, anywhere users work. Example functionalities provided by SASE include, but are not limited to, software-defined wide area network, secure web gateway, firewall as a service, cloud access security broker, and zero-trust network access. The SASE model aims to consolidate these functions in a single, integrated cloud service.

Remote devices may connect to a SASE architecture via a respective cloud-based virtual private network (VPN) headend (which may also be referred to as a cloud headend or cloud VPN headend).

A cloud headend on the front end may be serving many separate organizations or tenants (remotely connected endpoints), each of which can have anywhere from one to many thousands of remote workers, branch offices, and on-premises data centers, etc. Each endpoint may have a corresponding VPN tunnel established to the headend along with its own routing protocol (static routes, BGP, a combination of both, etc.), which provides routes to the tunnel termination point to connect its branch to the rest of the organization. In addition, these tunnels are distributed and terminated amongst a set of data nodes at each headend, each of which should understand the routes and how to get from each branch, an end device (e.g., a laptop or a device), and/or data centers to other branches, end devices, data centers, etc. Moreover, within the SASE architecture, there are services, such as Cloud-Delivered Fire Wall (CDFW) services, web proxy (SIG), along with access points to the internet and the customers' cloud and SaaS providers.

To be able to route traffic between any two of a tenant's endpoints, every data node that contains a tunnel for a tenant should keep track of all of that tenant's routes, and by default any of these endpoints could access any other. Since typically most remote end devices and branches need access to a few resources (e.g., on-premises data centers, internet, common services, etc.) and not to each other, a simple declarative way to tell a SASE controller which endpoint can talk to which is desired, without configuration becoming overly burdensome.

The present disclosure provides a solution, whereby any given endpoint could be marked with a corresponding access designation, which can be (1) "isolated", allowing access only to the internet and/or any other endpoints marked as "shared" (but not vice versa) in order to allow access to on-premises services in addition to internet resources; (2) "shared", allowing access to and from "private", but not "isolated" sources; (3) "public" allowing unrestricted access (e.g., to Internet and public cloud services and/or other remotely connected endpoints); and (4) "private", allowing access to only "public" endpoints and resources but not other "private" endpoints.

In another example, a given tenant organization can also allow community strings similar to what private Virtual Local Area Networks (pVLANs) do, further separating private and shared resources into their own groups or departments. Accordingly, communities can have their respective access designation just as individual endpoints do (it should be noted that an "isolated" node cannot be part of a community, but a community as a whole may be designated as "isolated").

As a large organization would typically deploy all of the above from templates, or by using terraform, ansible, or the like, these can be set in a very efficient manner, giving an organization a simple way to specify both what traffic is allowed, and which routes need to be propagated to which data nodes by updating a corresponding routing table at each data node.

For example, if an organization has 10,000 locations world-wide connected to a SASE architecture, each data node in the data center would need to know at least 10,000, and probably more, routes to be able to handle any-to-any traffic. However, with the above scheme, assuming only a small number of endpoints need to communicate with one another, a routing table at each node that would otherwise have to have thousands of entries identifying routes from one endpoint to the next, can be pared down to only a few hundred for a data node supporting hundreds of tunnels, making propagation faster and less burdensome on memory and network resources.

Figure 2:
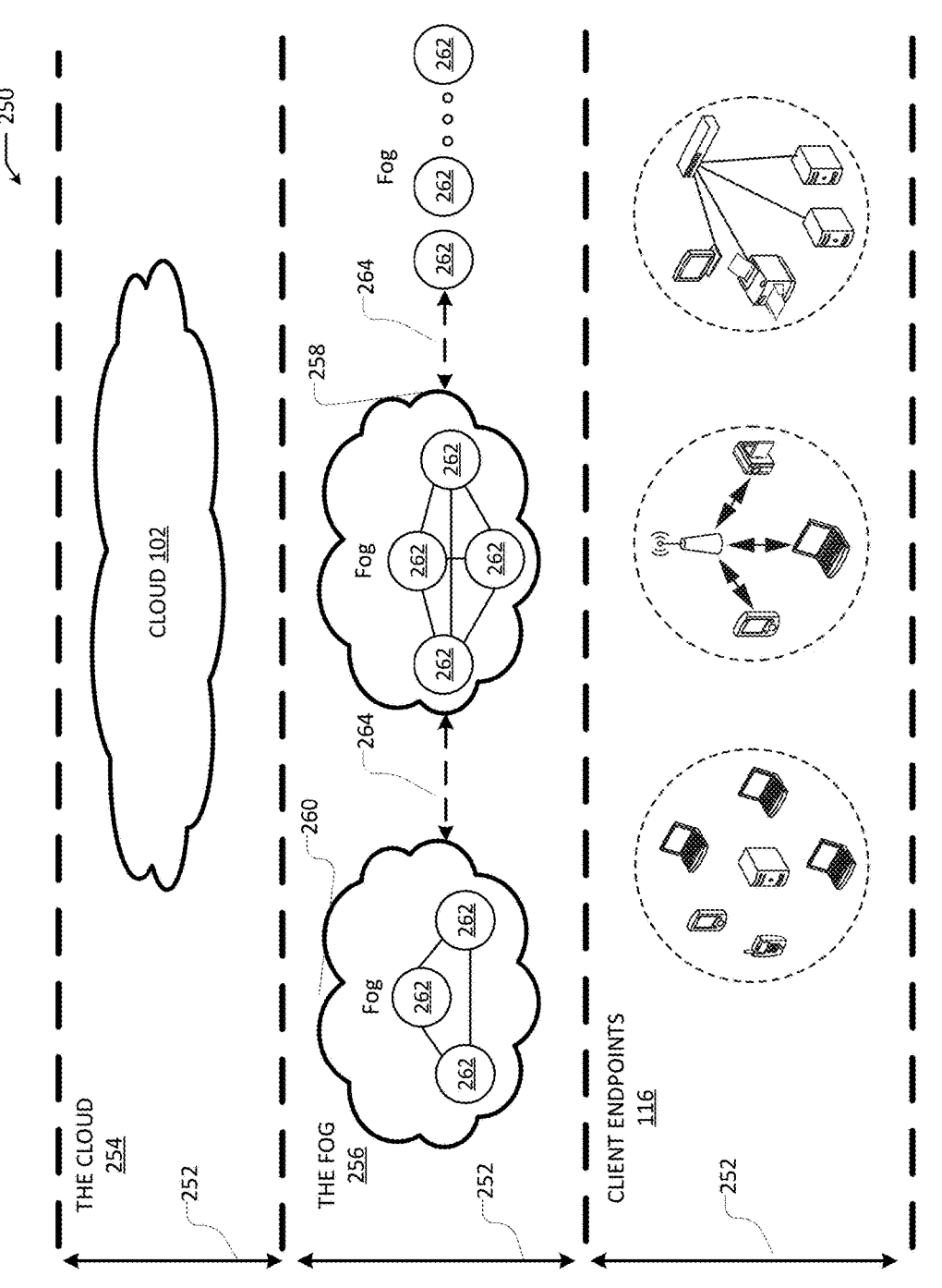
FIG. 2 illustrates an example fog computing architecture, according to some aspects of the present disclosure.
Figure 8:
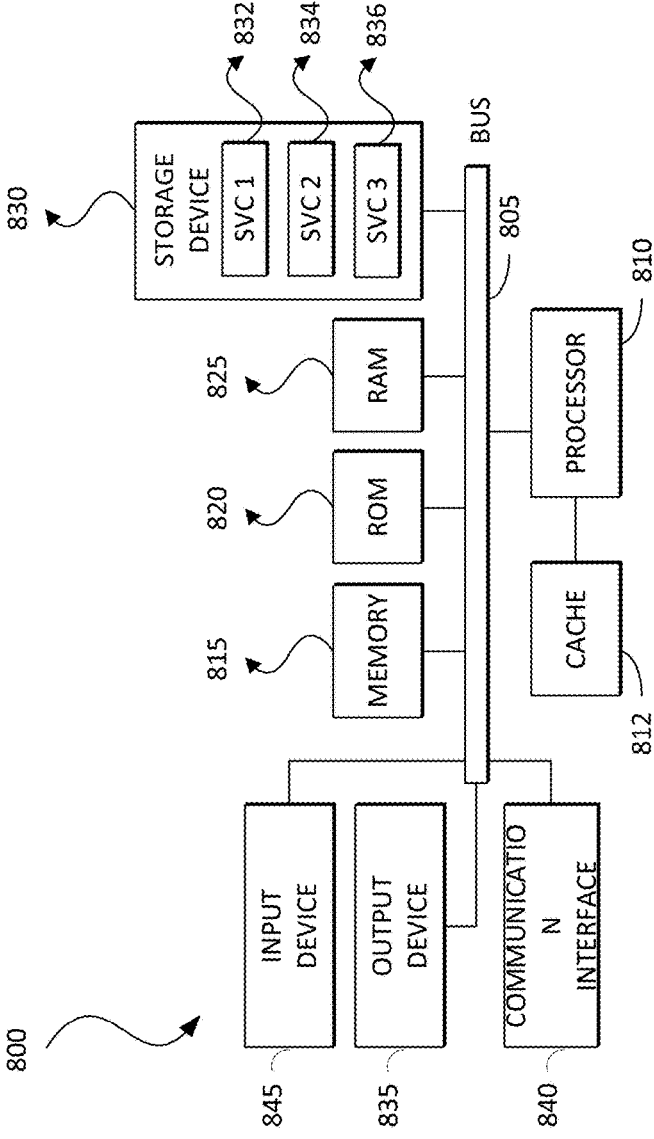
FIG. 8 illustrates an example computing system architecture, according to some aspects of the present disclosure.
Figure 9:
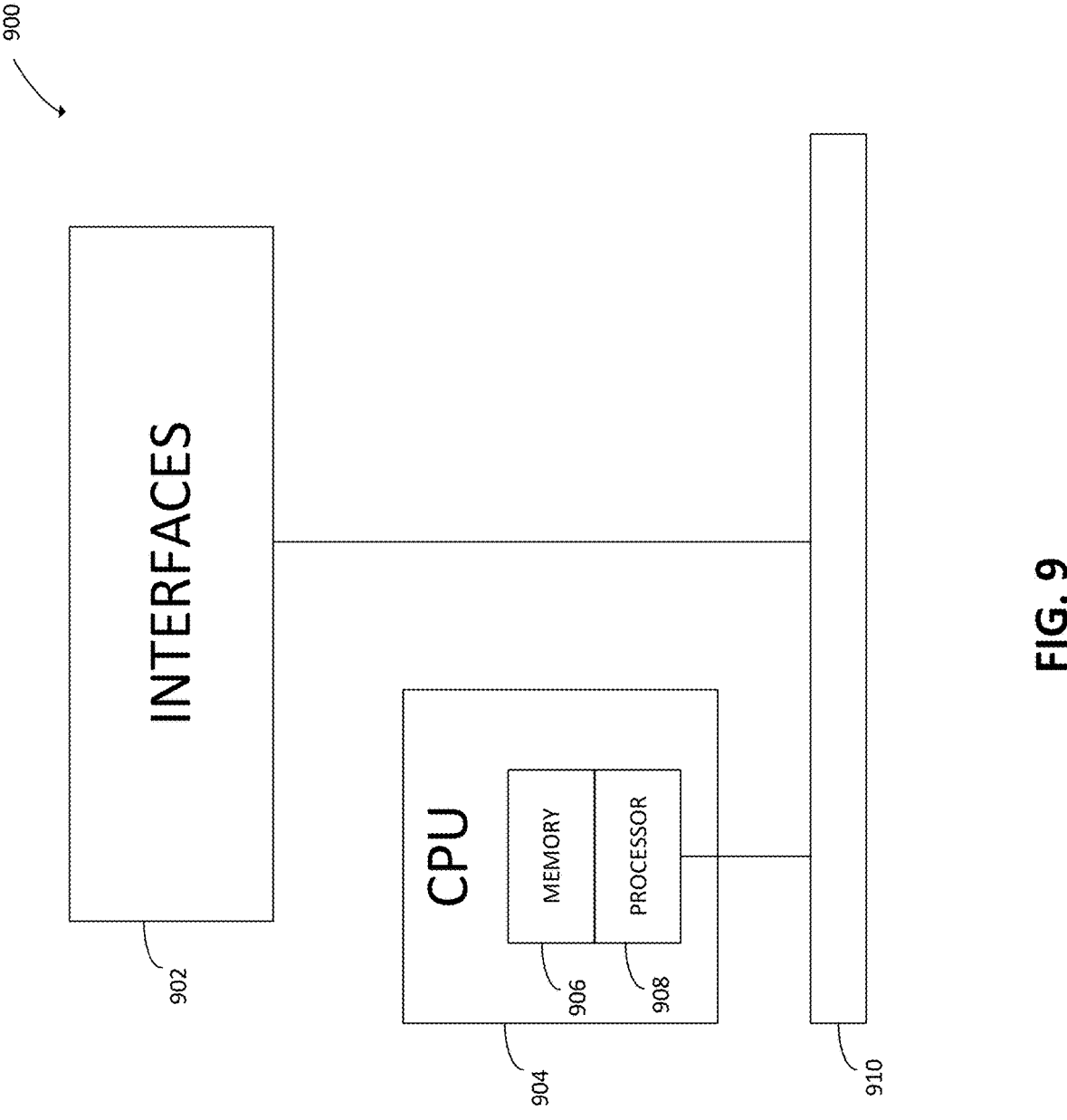
FIG. 9 illustrates an example network device, according to some aspects of the present disclosure.

A description of example network environments and architectures for network data access and services, as illustrated in FIGS. 1 and 2, is first disclosed herein. One or more examples of a SASE based architecture are described with reference to FIGS. 3 and 4. Examples of access designation and routing optimization will then be described with reference to FIGS. 5 and 6A-B. An example access control and routing optimization method at a cloud headend is then described with reference to FIG. 7. The discussion then concludes with a brief description of example devices, as illustrated in FIGS. 8 and 9.

FIG. 1 illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 2 illustrates a diagram of an example fog computing architecture 250. The fog computing architecture 250 can include the cloud layer 254, which includes the cloud 102 of FIG. 1 and any other cloud system or environment, and the fog layer 256, which includes fog nodes 262. The client endpoints 116 (same as in FIG. 1) can communicate with the cloud layer 254 and/or the fog layer 256. The architecture 250 can include one or more communication links 252 between the cloud layer 254, the fog layer 256, and the client endpoints 116. Communications can flow up to the cloud layer 154 and/or down to the client endpoints 116.

The fog layer 256 or "the fog" provides the computation, storage and networking capabilities of traditional cloud networks, but closer to the endpoints. The fog can thus extend the cloud 102 to be closer to the client endpoints 216. The fog nodes 262 can be the physical implementation of fog networks. Moreover, the fog nodes 262 can provide local or regional services and/or connectivity to the client endpoints 116. As a result, traffic and/or data can be offloaded from the cloud 102 to the fog layer 256 (e.g., via fog nodes 262). The fog layer 256 can thus provide faster services and/or connectivity to the client endpoints 116, with lower latency, as well as other advantages such as security benefits from keeping the data inside the local or regional network(s).

The fog nodes 262 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 262 can be deployed within fog instances 258, 260. The fog instances 258, 258 can be local or regional clouds or networks. For example, the fog instances 256, 258 can be a regional cloud or data center, a local area network, a network of fog nodes 262, etc. In some configurations, one or more fog nodes 262 can be deployed within a network, or as standalone or individual nodes, for example. Moreover, one or more of the fog nodes 262 can be interconnected with each other via links 264 in various topologies, including star, ring, mesh or hierarchical arrangements, for example.

In some cases, one or more fog nodes 262 can be mobile fog nodes. The mobile fog nodes can move to different geographical locations, logical locations or networks, and/or fog instances while maintaining connectivity with the cloud layer 254 and/or the endpoints 116. For example, a particular fog node can be placed in a vehicle, such as an aircraft or train, which can travel from one geographical location and/or logical location to a different geographical location and/or logical location. In this example, the particular fog node may connect to a particular physical and/or logical connection point with the cloud 254 while located at the starting location and switch to a different physical and/or logical connection point with the cloud 254 while located at the destination location. The particular fog node can thus move within particular clouds and/or fog instances and, therefore, serve endpoints from different locations at different times.

Figure 3:
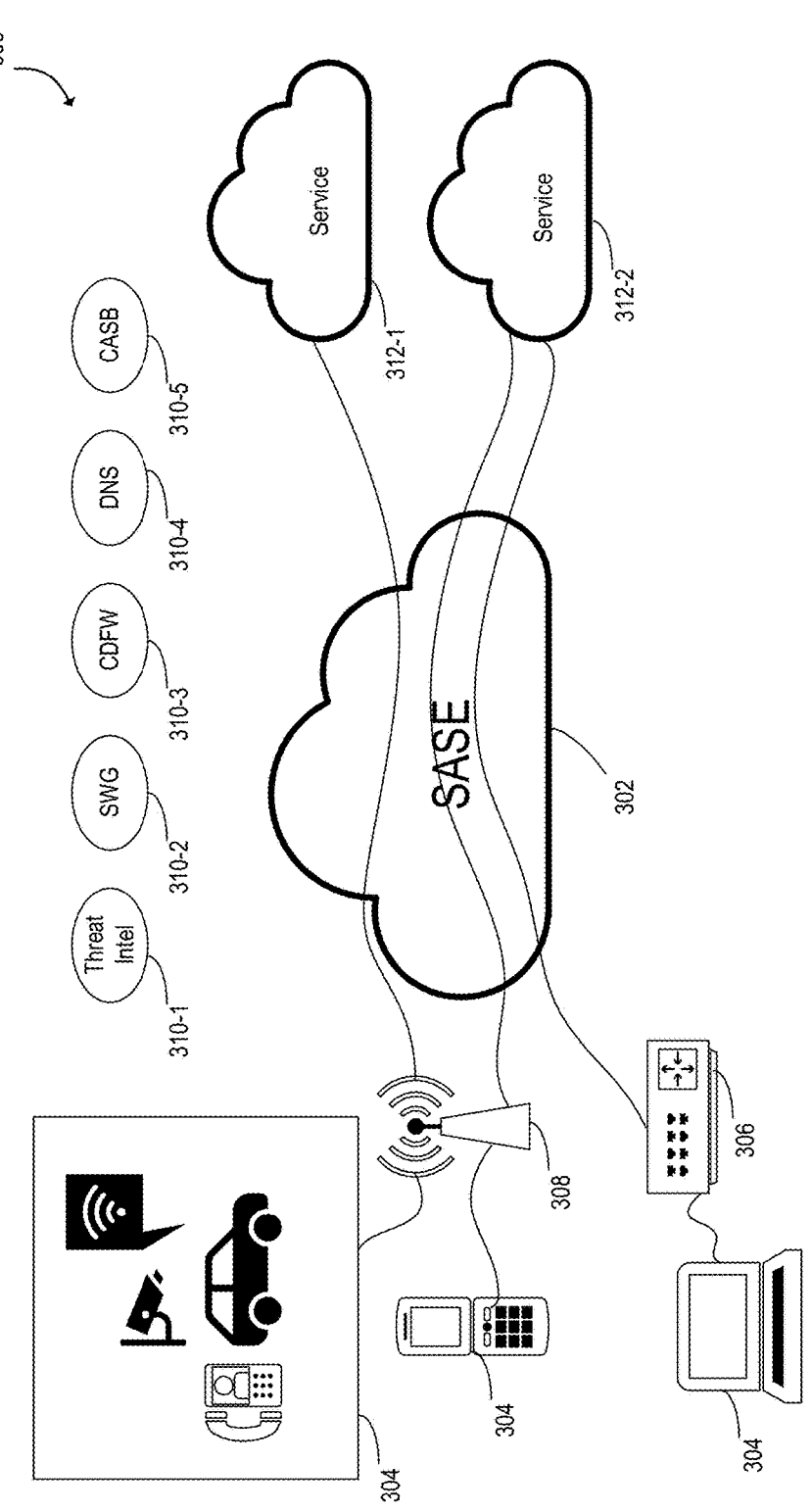
FIG. 3 illustrates an example SASE based architecture, according to some aspects of the present disclosure.

FIG. 3 illustrates an example SASE based architecture, according to some aspects of the present disclosure. A SASE based architecture 100 of FIG. 3 includes a SASE controller 302. SASE controller 302 may be a cloud-based component residing on one or more decentralized or centralized servers and communicatively coupled to any number of network devices, servers, etc., including user devices 304, services 312-1 and 312-2, etc. Controller 302 may be a software-defined network such as that described above with reference to FIGS. 1 and 2. Components of controller 302 may include one or more cloud-based headends, one or more CDFW, one or more routers, etc., all of which will be described in more detail with reference to FIG. 4.

Architecture 300 further includes user devices 304 that may remotely connect to controller 302 via any known or to be developed Virtual Private Network (VPN) connection including, but not limited to, Point-to-Point Tunneling Protocol (PPTP), Layer 2 Tunneling Protocol (L2TP), Internet Protocol Security (IPSec), Secure Sockets Layer (SSL), Internet Key Exchange Version 2 (IKEv2), etc.

User devices 304 can be any type of known or to be developed device capable of remotely accessing one or more of services 312-1 and 312-2 via controller 302. For example, user devices 304 can include a laptop, a mobile device, Internet of Things (IoT) devices, a router, a server, etc. User devices 304 may be the same as client endpoints 116 of FIG. 1.

Each user device 304 may connect to controller 302 via a corresponding access point such as access point 306, 308, etc. SASE services provided by controller 302 may include, but are not limited to, security services such as threat intelligence service 310-1, Secure Web Gateway (SWG) service 310-2, CDFW 310-3, Domain Name Services (DNS) 310-4, Cloud Access Security Broker (CASB) services 310-5, etc.

Any one or more of user devices 304 may access any one or more services 312-1 and/or 312-2. Services 312-1 and/or services 312-2 may be private cloud-based services provided by operator of controller 302, a third-party cloud-based services, a public cloud-based services, and/or a hybrid of the same. For example, a private cloud-based service can be an enterprise 5G services. An example of a third-party cloud-base service can be a cloud-storage service (e.g., Google cloud storage), a cloud-based computing services provided by Amazon, Microsoft, Google, Facebook, etc.

Figure 4:
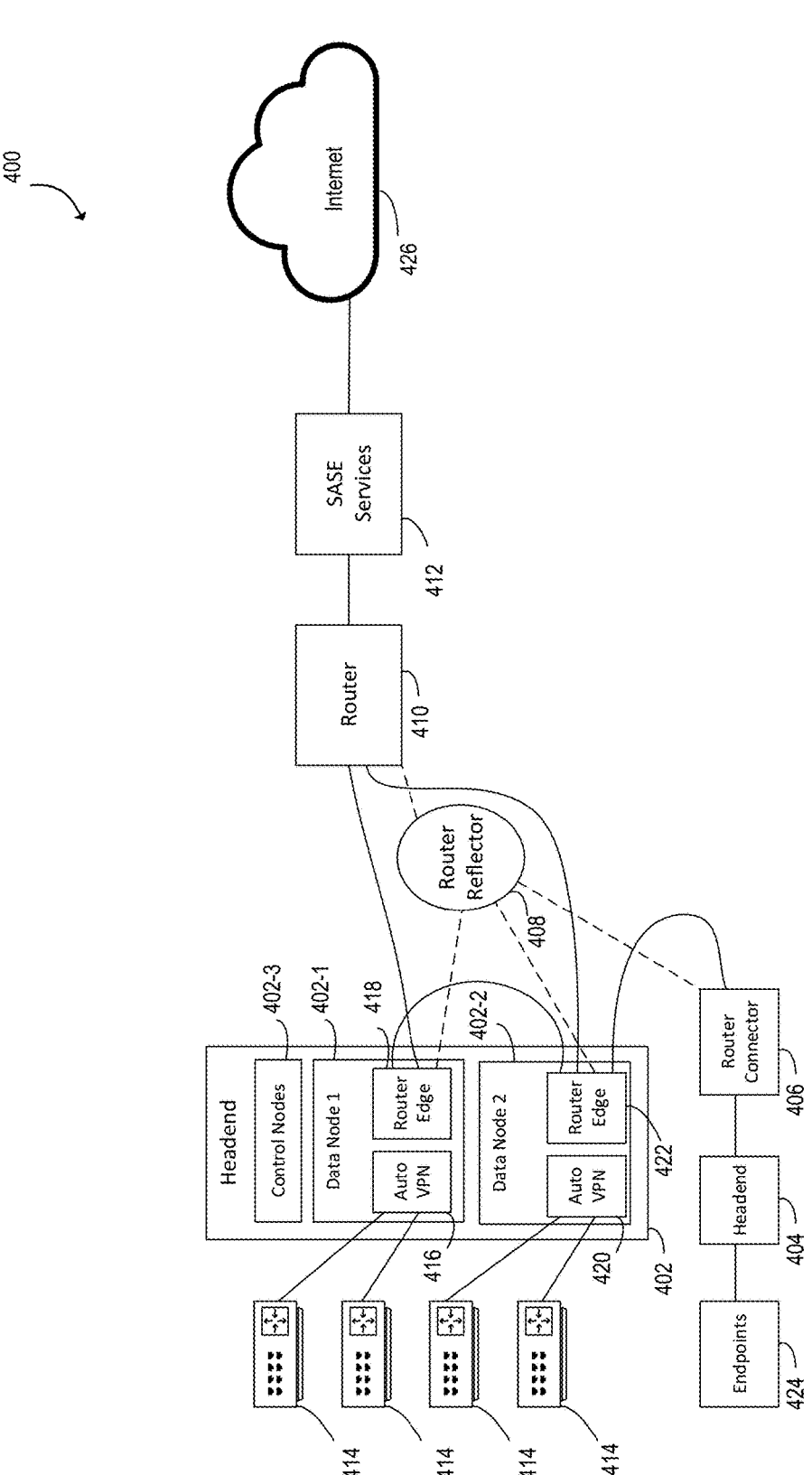
FIG. 4 is an alternative illustration of SASE architecture of FIG. 3 with remotely connected endpoints, according to some aspects of the present disclosure.

FIG. 4 is an alternative illustration of SASE architecture of FIG. 3 with remotely connected endpoints, according to some aspects of the present disclosure.

In architecture 400, a number of components of a SASE controller such as SASE controller 302 are shown. Namely, components including headend 402, headend 404, router reflector 406, router connector 408, router 410 and SASE services 412 (e.g., CDFW, SIG, etc.) that are part of SASE controller 302 are shown in FIG. 4.

Figure 6A:
FIGS. 6A-B illustrate examples of routing optimization based on access designation of endpoints in a SASE environment, according to some aspects of the present disclosure.
Figure 6B:

Headend 402 may be a Meraki AutoVPN headend (a particular protocol for secure and private remote connectivity) to which a number of endpoints 414 can connect in order to access controller 302 and SASE services 412. While Meraki AutoVPN headend is one non-limiting example of headend 402, headend 402 may be associated with and operate based on any secure tunning protocol used between on-premise devices and a headend including, but not limited to, IPsec, WireGuard, or SSLVPN protocols, etc. Endpoints 414 can be a branch of an organization (a router such as a Meraki MX router at a branch to which other end devices are connected such as laptops, cellular phones, computers, phones, printers, IoTs, etc.), may be individual end devices, and/or on-premises data centers. Each endpoint 414 may be connected to one of a plurality of data nodes inside headend 402, with each node having a corresponding tunnel established at headend 402 (examples of which are shown in FIGS. 6A-B). In the non-limiting example of FIG. 4, headend 402 has data node 1 402-1 and data node 2 402-2. Headend 402 may also have one or more control nodes 402-3 for control plane communication with remotely connected endpoints 414 and/or other components inside controller 302.

Each data node inside headend 402 may have an AutoVPN component and a router edge (e.g., an extension of router 408). As shown in FIG. 4, data node 402-1 has AutoVPN 416 and router edge 418 while data node 402-2 has AutoVPN 420 and router edge 422. As will be described below, each of data nodes 402-1 and 402-2 may have a corresponding routing table that may be optimized according to the processes of the present disclosure to include only routes for nodes to and from which access is permitted based on their respective access designation.

FIG. 4 also illustrates other example types of remote endpoints that may connect to SASE controller 302 via their corresponding headend. For example, such endpoints are shown collectively as endpoints 424 (e.g., Cisco AnyConnect endpoints) that establish a corresponding VPN connection to headend 404. Each endpoint 424 may also have an access designation based on which a corresponding routing table at headend 404 may be updated and then propagated to other (and relevant) data nodes inside controller 302 via router connector 406. For example, FIG. 4 illustrates that routing tables may be communicated (shared) by and between router connector 406, router end 418, router edge 422 and router 410 (e.g., using Layer 3 Geneve, VXLAN, NVGRE, MPLS, or other known or to be developed tunnels shown using solid lines in FIG. 3). As shown in FIG. 4, router reflector 408 at SASE controller 302 may communicate with router connector 406, router edges 418 and 422, and router 410 using routing protocols such as BGP protocol (shown via dashed/broken lines).

Relevant data arriving at controller 302 via respective headends (e.g., headend 402 or 404), can then be passed to router 410, which then decides the next destination or the data (e.g., SASE services such as CDFW, SIG, etc.) and/or the Internet 426.

Figure 5:
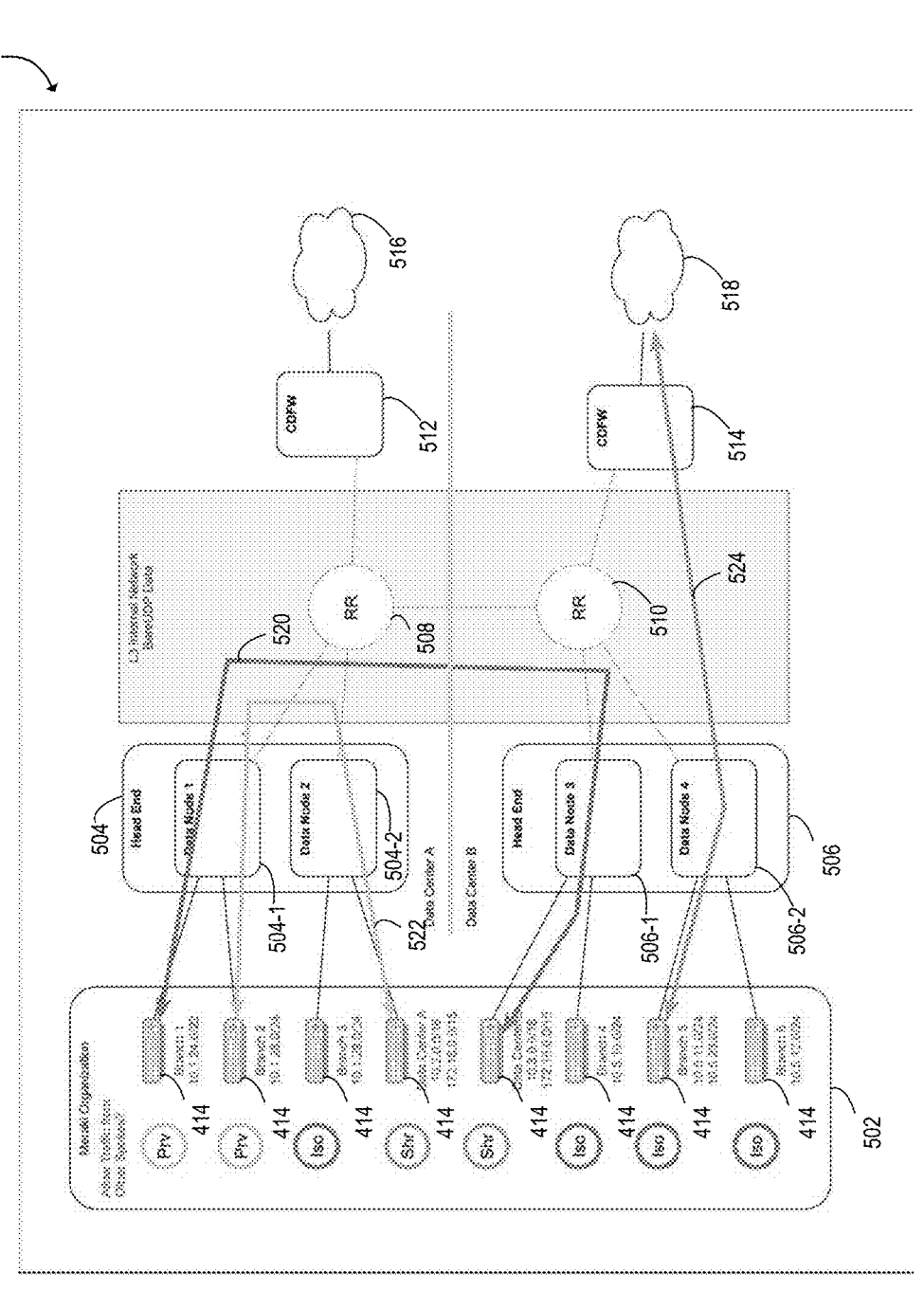
FIG. 5 illustrates an example of access designation and associated routing between endpoints, according to some aspects of the present disclosure.

FIG. 5 illustrates an example of access designation and associated routing between endpoints, according to some aspects of the present disclosure. In non-limiting example 500 of FIG. 5, endpoints 414 (same as endpoints 414 of FIG. 4) each have an access designation. An access designation is shown as "Prv" for "private," "Iso" for "isolated," and "Shr" for "shared." While not shown in FIG. 5, "public" is also an option for access designation (e.g., "Pub" for "public). As noted above, the access designations may be defined as (1) "isolated", allowing access only to the internet and/or any other endpoints marked as "shared" (but not vice versa) to allow access to on-premises services in addition to internet resources; (2) "shared", allowing access to and from any "private", but not "isolated" sources; (3) "public" allowing unrestricted access (e.g., to Internet and public cloud services and/or other remotely connected endpoints); and (4) "private", allowing access to only "public" endpoints and resources but not other "private" endpoints.

In example 500, endpoints 414, just as described with reference to FIG. 4, can be endpoints belonging to an organization (e.g., a Meraki organization) and can be a branch, a data center, an end device (e.g., a laptop, a mobile device, an IoT device, etc.). In FIG. 5, endpoints 414 are collectively shown as forming an organization 502. Endpoints 414 are further shown as being connected to a respective headend 504 in data center A or headend 506 in data center B. Headends 504 and 506 may be the same as headend 402 of FIG. 4. Each data center may have more than one headend shown in FIG. 5. Each of headends 504 and 506 may have one or more data nodes such as data nodes 504-1 and 504-2 at headend 504 and data nodes 506-1 and 506-2 at headend 506. Route reflectors (RR) 508 and 510 may be the same as route reflector 408 of FIG. 4. CDFWs 512 and 514 may be the same CDFW provided as part of SASE services 412 of FIG. 4. Internet 516 and 518 may be the general internet, a customer or tenant's cloud and SaaS providers, etc.

FIG. 5 shows three non-limiting examples of routing between nodes having varying access designations. For example, endpoint 414 that is Branch 1 connected to data node 504-1 has access designation "Prv" and is shown as being allowed to send traffic to and from endpoint 414 that is on-premises data center B connected to data node 506-1 in data center B, having access designation "Shr". This bi-directional communication (shown via line 520) is allowed because an endpoint having access designation "Shr" (e.g., on-premises data center B in this example) is allowed access to and from any node with "Prv" designation (e.g., Branch 1 in this example).

In another example, endpoint 414 that is Branch 2 connected to data node 504-1 has access designation "Prv" and is shown as being allowed to send traffic to and from endpoint 414 that is on-premises data center A connected to data node 504-2 in data center A, having access designation "Shr". This bi-directional communication (shown via line 522) is allowed because an endpoint having a "Shr" designation (e.g., on-premises data center B in this example) is allowed access to and from any node with "Prv" designation (e.g., Branch 1 in this example).

In another example, endpoint 414 that is Branch 5 connected to data node 506-2 has access designation "Iso" and is shown as being allowed to only communicate with Internet 518 and/or any other endpoints marked as "shared" (but not vice versa) in order to access on-premises services in addition to internet resources. This bi-directional communication is shown via line 524 in FIG. 5.

FIGS. 6A-B illustrate examples of routing optimization based on access designation of endpoints in a SASE environment, according to some aspects of the present disclosure.

FIG. 6A illustrates a simplified version of environment 500 of FIG. 5 with four example endpoints 414. Two endpoints 414 are connected to data node 504-1 (same as data node 504-1 of FIG. 5) while the other two example endpoints 414 are connected to data node 504-2 as data node 504-1 of FIG. 5). Router reflector 614, router 616 (may also be referred to as Frouter Connector), and CDFW/SIG 618 are the same as router reflector 408, router 410, and SASE services 412 of FIG. 4, respectively and hence will not be described further. Moreover, router edge 606 and router edge 612 (may also be referred to as Frouter edge 606 and Frouter edge 612) are the same as router edges 418 and 422 of FIG. 4, respectively and hence will not be described further.

In environment 600 of FIG. 6A, it is shown that each endpoint 414 has a corresponding tunnel and a corresponding one of data nodes 504-1 or 504-2. For example, endpoint 414 (Branch 1) has tunnel 602 terminating at data node 504-1, endpoint 414 (Branch 2) has tunnel 604 terminating at data node 504-1, endpoint 414 (Branch 3) has tunnel 610 terminating at data node 504-2, and endpoint 414 (Branch 4) has tunnel 612 terminating at data node 504-2.

As shown in FIG. 6A, each of data nodes 504-1 and 504-2, as well as router 616 have a corresponding routing table. Data node 504-1 has routing table 620, data node 504-2 has routing table 622, and router 616 has routing table 624. Without applying the routing optimization process of the present disclosure, each routing table would have a separate entry for routing traffic from every endpoint 414 to every other endpoint 414. As such, routing tables 620, 622, and 624 have the same number of entries. In this instance, as the number of endpoints 414 increases, so do the entries in every single routing table. For instance, when an organization has hundreds to thousands to even tens of thousands of endpoints, each routing table at every data node inside every headend as well as the router inside the SASE controller would have to have the same (or as close to) number of entries as the number of endpoints. However, given the corresponding access designation associated with each endpoint, in practice, many endpoints neither are allowed to nor need to communicate with many other endpoints (e.g., endpoints with "Iso" designation cannot communicate with one another). Therefore, there is no need for corresponding entries in every routing table for routing network traffic to and from endpoints that cannot communicate with one another.

This optimization (e.g., deleting entries in routing tables for endpoints that cannot communicate with one another due to their respective access designation) is shown in FIG. 6B. While this optimization is shown on a smaller scale with reference to FIG. 6B to convey the underlying concept, one can readily appreciate the extent of the optimization when the number of branches are in the hundreds to tens of thousands.

FIG. 6B illustrates example entries that may be deleted from routing tables 620 and 622 at data nodes 504-1 and 504-2 respectively. For example, endpoints 414 connected to data node 504-1 may have the "Iso" designation, which prevents them from communicating with endpoints 414 connected to data node 504-2. Therefore, entries in routing table 620 identifying routes from endpoints 414 (connected to data node 504-1) to router edge 612 and router edge 606 to router edge 612 may be deleted. Similarly, entries in routing table 622 identifying routes from endpoints 414 (connected to data node 504-2) to router edge 606 may be deleted.

FIG. 7 illustrates example process for access control and routing optimization, according to some aspects of the present disclosure. FIG. 7 will be described from the perspective of headend 402. However, it will be understood that computer-readable instructions stored on one or more memories may be executed by one or more processors (e.g., residing on cloud-accessible servers) to implement functionalities of various components of headend 402 (e.g., data nodes 402-1 and 402-2, router edges 418 and 422, etc.) as described above, to perform steps of the process of FIG. 7 described below. FIG. 7 may be described with reference to any one of FIGS. 4 to 6A-B.

At S700, headend 402 receives a corresponding access designation for each of a plurality of endpoints (e.g., endpoints 414). As described above, each access designation can specify a type of access a corresponding endpoint has to remaining ones of the plurality of endpoints and other accessible network resources (e.g., the internet, SASE services, customer's private cloud and SaaS, etc.). Headend 402 may also be referred to as an edge component of SASE controller 302. In one example, the designation may be received, via a dashboard (e.g., a user interface) that provides controls and functionalities to a network operator to control operations of endpoints 414, configure endpoints 414, define and implement network and security policies, and/or otherwise manage the endpoints and their access to SASE architecture. As noted above, the plurality of endpoints are remotely connected to the SASE architecture via headend 402 and using a corresponding virtual private network connection (e.g., AnyConnect, Meraki, Latitude, and/or any other type of known or to be developed connection to controller 302).

At S702 and based on the corresponding access designation of each of the plurality of endpoints received at S700, headend 402 updates a routing table (e.g., corresponding one of routing tables 620 and 622) to include routing information for a subset of the plurality of endpoints having access to at least one other endpoint of the plurality of endpoints or to the other accessible network resources. S702 may be carried out as described above with reference to FIG. 6B.

In some examples and upon updating a routing table at a given data node at headend 402, the updates may be communicated (shared) with other data nodes at headend 402 and/or data nodes at other headends of SASE controller 302 so that each headend can update its corresponding routing tables at corresponding data nodes thereof. This sharing of updated routing information may be made through communications between router edges (e.g., router edges 418 and 422) associated with each data node and router reflector 408. Alternatively, access designations may simply be shared among headends and their respective data nodes such that a routing table at each data node may be updated.

At S704, headend 402 may share the access designations of each endpoint it receives with various components inside SASE controller 302 (e.g., SASE services 412). By sharing the access designations with SASE services 412 (e.g., a CDFW), such SASE service can determine an appropriate type of network or security policies to the associated traffic, as defined by the network operator (e.g., via the dashboard described above).

At S706, headend 402 enables routing of network traffic to and from endpoints remotely connected to headend 402 based on one or more updated routing tables associated with one or more data nodes at headend 420.

By implementing access control and routing optimization as described above with reference to FIGS. 3-7, the present disclosure provides a solution for improving security of a SASE architecture and optimizing network resource consumption through eliminating maintenance of large routing tables at various data nodes inside headends of a SASE controller. The magnitude of such optimization increases as the number of endpoints of an organization utilizing the SASE architecture increases, as described above.

The disclosure next turns to description of system architecture and devices that can be utilized as components of controller 302, headend 402, any of data nodes 402-1 and 402-2, router edges 418 and 422, router reflector 408, router 410, and/or any other system component described above with reference to FIGS. 1-7.

FIG. 8 illustrates a computing system architecture, according to some aspects of the present disclosure. Components of computing system architecture 800 are in electrical communication with each other using a connection 805, such as a bus. Exemplary system 800 includes a processing unit (CPU or processor) 810 and a system connection 805 that couples various system components including the system memory 815, such as read only memory (ROM) 820 and random access memory (RAM) 825, to the processor 810. The system 800 can include a cache 812 of high-speed memory connected directly with, in close proximity to, or integrated as part of the processor 810. The system 800 can copy data from the memory 815 and/or the storage device 830 to the cache 812 for quick access by the processor 810. In this way, the cache 812 can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware or software service, such as service (SVC) 1 832, service (SVC) 2 834, and service (SVC) 3 836 stored in storage device 830, configured to control the processor 810 as well as a special-purpose processor where software instructions are incorporated into the actual processor design. The processor 810 may be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include services 832, 834, 836 for controlling the processor 810. Other hardware or software modules are contemplated. The storage device 830 can be connected to the system connection 805. In one aspect, a hardware module that performs a particular function can include the software component stored in a computer-readable medium in connection with the necessary hardware components, such as the processor 810, connection 805, output device 835, and so forth, to carry out the function.

FIG. 9 illustrates an example network device, according to some aspects of the present disclosure. Example network device 900 can be suitable for performing switching, routing, load balancing, and other networking operations. Network device 900 includes a central processing unit (CPU) 904, interfaces 902, and a bus 910 (e.g., a PCI bus). When acting under the control of appropriate software or firmware, the CPU 904 is responsible for executing packet management, error detection, and/or routing functions. The CPU 904 preferably accomplishes all these functions under the control of software including an operating system and any appropriate applications software. CPU 904 may include one or more processors 908, such as a processor from the INTEL X86 family of microprocessors. In some cases, processor 908 can be specially designed hardware for controlling the operations of network device 900. In some cases, a memory 906 (e.g., non-volatile RAM, ROM, etc.) also forms part of CPU 904. However, there are many different ways in which memory could be coupled to the system.

The interfaces 902 are typically provided as modular interface cards (sometimes referred to as "line cards"). Generally, they control the sending and receiving of data packets over the network and sometimes support other peripherals used with the network device 900. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications-intensive tasks, these interfaces allow the master CPU 904 to efficiently perform routing computations, network diagnostics, security functions, etc.

Although the system shown in FIG. 9 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 900.

Regardless of the network device's configuration, it may employ one or more memories or memory modules (including memory 906) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 906 could also hold various software containers and virtualized execution environments and data.

The network device 900 can also include an application-specific integrated circuit (ASIC), which can be configured to perform routing and/or switching operations. The ASIC can communicate with other components in the network device 900 via the bus 910, to exchange data and signals and coordinate various types of operations by the network device 900, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
receiving, at an edge component of a cloud-based secure access service, an access designation for at least one endpoint of a plurality of endpoints, the access designation specifying a type of access the at least one endpoint has to accessible network resources, the at least one endpoint being remotely connected to the cloud-based secure access service via the edge component;
based on the access designation of the at least one endpoint, updating a routing table at the edge component to include routing information for the at least one endpoint to one or more of the accessible network resources; and enabling routing of network traffic, via the cloud-based secure access service, between the at least one endpoint and the one or more accessible network resources based at least in part on the routing table.
2. The method of claim 1, wherein the access designation is one of:
a public access designation allowing full access to the accessible network resources;
a private access designation allowing access to the accessible network resources having a public access designation;
a shared access designation allowing access to the accessible network resources having the private access designation; and
an isolated designation allowing access only to the internet only.
3. The method of claim 2, wherein updating the routing table includes deleting at least one entry in the routing table identifying a route with the isolated designation.
4. The method of claim 1, wherein the edge component is at a first data center of the cloud-based secure access service.
5. The method of claim 4, further comprising:
sending the updated routing table to at least one other edge component at a second data center of the cloud-based secure access service.
6. The method of claim 1, further comprising:
sending the access designation of the at least one endpoint to one or more components at the cloud-based secure access service for servicing associated network traffic, the one or more components applying network and security policies to the associated network traffic based at least on part on the access designation.
7. The method of claim 1, wherein the edge component comprises a number of data nodes and each data node has a corresponding routing table.
8. The method of claim 7, further comprising updating the corresponding routing table for each of the data nodes.
9. A system comprising:
at least one processor; and
at least one memory, storing instructions which when executed by the at least one processor causes the system to:
receive, at an edge component of a cloud-based secure access service, an access designation for at least one endpoint of a plurality of endpoints, the access designation specifying a type of access the at least one endpoint has to accessible network resources, the at least one endpoint being remotely connected to the cloud-based secure access service via the edge component;
based on the access designation of the at least one endpoint, update a routing table at the edge component to include routing information for the at least one endpoint to one or more of the accessible network resources; and
enable routing of network traffic, via the cloud-based secure access service, between the at least one endpoint and the one or more accessible network resources based at least in part on the routing table.
10. The system of claim 9, wherein the access designation is one of:
a public access designation allowing full access to the accessible network resources;
a private access designation allowing access to the accessible network resources having a public access designation;

a shared access designation allowing access to the accessible network resources having the private access designation; and an isolated designation allowing access only to the internet only.

11. The system of claim 10, wherein updating the routing table includes deleting at least one entry in the routing table identifying a route with the isolated designation.

12. The system of claim 9, wherein the edge component is at a first data center of the cloud-based secure access service.

13. The system of claim 12, further comprising instructions which when executed by the at least one processor cause the system to:

send the updated routing table to at least one other edge component at a second data center of the cloud-based secure access service.

14. The system of claim 9, further comprising instructions which when executed by the at least one processor cause the system to:

send the access designation of the at least one endpoint to one or more components at the cloud-based secure access service for servicing associated network traffic, the one or more components applying network and security policies to the associated network traffic based at least on part on the access designation.

15. The system of claim 9, wherein the edge component comprises a number of data nodes and each data node has a corresponding routing table.

16. The system of claim 15, further comprising updating the corresponding routing table for each of the data nodes.

17. At least one non-transitory computer-readable medium storing instructions which when executed by at least one processor causes the at least one processor to:

receive, at an edge component of a cloud-based secure access service, an access designation for at least one endpoint of a plurality of endpoints, the access designation specifying a type of access the at least one endpoint has to accessible network resources, the at least one endpoint being remotely connected to the cloud-based secure access service via the edge component;

based on the access designation of the at least one endpoint, update a routing table at the edge component to include routing information for the at least one endpoint to one or more of the accessible network resources; and enable routing of network traffic, via the cloud-based secure access service, between the at least one endpoint and the one or more accessible network resources based at least in part on the routing table.

18. The at least one non-transitory computer-readable medium of claim 17, wherein the access designation is one of:

a public access designation allowing full access to the accessible network resources;

a private access designation allowing access to the accessible network resources having a public access designation;

a shared access designation allowing access to the accessible network resources having the private access designation; and an isolated designation allowing access only to the internet only.

19. The at least one non-transitory computer-readable medium of claim 18, wherein updating the routing table includes deleting at least one entry in the routing table identifying a route with the isolated designation.

20. The at least one non-transitory computer-readable medium of claim 17, wherein the edge component is at a first data center of the cloud-based secure access service.

* * * * *